United States Patent [19]

Leavitt et al.

[11] 4,373,159

[45] Feb. 8, 1983

[54] HEAT AND DETECTION RESISTANT IDENTIFICATION APPARATUS

[75] Inventors: Alvan W. Leavitt, West Mifflin; Alice E. Primm, Pleasant Hills, both of Pa.

[73] Assignee: Claim Guard Associates, Pittsburgh, Pa.

[21] Appl. No.: 164,360

[22] Filed: Jun. 30, 1980

[51] Int. Cl.[3] ........................ G01S 13/78; B65D 85/00

[52] U.S. Cl. .................................... 343/6.5 R; 206/39; 206/232; 206/525; 312/204

[58] Field of Search ............. 343/6.5 R, 6.8 R, 112 R; 312/204, 234.1, 234.3; 206/37, 38, 39, 232, 525

[56] References Cited

U.S. PATENT DOCUMENTS

| | | | |
|---|---|---|---|
| 1,573,663 | 2/1926 | Warren | 206/232 X |
| 1,743,899 | 1/1930 | Moffatt | 206/232 X |
| 3,618,059 | 11/1971 | Allen | 343/112 R X |

*Primary Examiner*—T. H. Tubbesing

*Attorney, Agent, or Firm*—Stanley J. Price, Jr.; John M. Adams

[57] ABSTRACT

An identifier such as a strip of heat resistant metal, containing preselected identifying information in the form of an alpha-numeric serial number is concealingly retained in a carrier member. The carrier member has a preselected shape and configuration adapted for releasable engagement to a structure, such as an item of personal property, to be identified by information such as the alpha-numeric serial number to disclose in a concealed manner ownership of the structure. In one manner of use, the carrier is an integral part of the structure to prevent visual detection of the carrier on the structure by a thief. The carrier member includes in one embodiment an amorphous body with the metal strip identifier encapsulated within the amorphous body. The amorphous body is indistinguishably attached to an item of personal property or the like, which ownership is identified by the information inscribed on the metal strip and is concealed on the item. In the event the item is stolen and later recovered ownership is established by removing the amorphous body from the item and separating the metal strip therefrom to reveal the information necessary to return the item to the rightful owner. The metal strip is also heat resistant to identify an item partially destroyed by fire. By recovering the metal strip, the metal strip can be used as proof of loss in an insurance claim for reimbursement.

39 Claims, 12 Drawing Figures

HEAT AND DETECTION RESISTANT IDENTIFICATION APPARATUS

BACKGROUND OF THE INVENTION

1. Field of the Invention

This invention relates to apparatus for identifying a structure and more particularly to identification apparatus that includes a carrier in the form of a fastener, capsule, amorphous body, or the like for concealing from detection an identifier containing information disclosing ownership of a structure to which the carrier is attached to facilitate return of the structure after recovery subsequent to a theft or to precisely identify a structure damaged by a catastrophic event, such as fire.

2. Description of the Prior Art

It is a well known practice to identify personal property, household possessions, and the like with some means of identification establishing ownership of the property, possession, or a description of the property. Thus in the event that the item of personal property or household possession is lost by theft and later recovered by the authorities, the true property owner can rightfully establish ownership for return of the item. One well known method of identifying an item of personal property is by inscribing a serial number or name or a combination of alpha-numeric information by a soldering torch on a metal surface or plate attached to the item. It is well known that automobile engine blocks are inscribed with a serial number, and the individual owner's name, social security, address, etc. can also be inscribed on the engine block.

The principal disadvantage of identifying personal property and household possessions by inscribing information directly on the item is that the information is readily detectable by a thief and is easily removed from the item. Thus the stolen property or merchandise can be easily passed in commerce by the thief without raising suspicion that the property has been stolen. In addition when the inscription is formed in the body of the structure, if the structure should be destroyed as a result of catastrophic circumstances such as fire, the inscribed information is also destroyed or at least destroyed beyond full recognition.

Thus if a thief detects the identifying information and removes the information from the property no means is available to establish rightful ownership if passed in commerce or later recovered. Similarly if an item of personal property should be substantially destroyed by fire to the point where identification of the property is uncertain, a rightful insurance claim can be frustrated and the loss sustained without reimbursement.

Therefore, there is need for apparatus by which personal property, household possessions, and the like can be readily identified by information which is concealed on the item to prevent detection of the information by a thief but known by the owner so that in the event of recovey, the owner can establish rightful possession and in the event the item should be substantially destroyed beyond precise identification by fire, the identifying information can remain intact to serve as a basis for justifying an insurance claim for reimbursement of the loss.

SUMMARY OF THE INVENTION

In accordance with the present invention there is provided apparatus for identifying a structure that includes identification means containing preselected information associated with a structure for selectively identifying the structure. A carrier member is provided, and means is associated with the carrier member for removably supporting the identification means on the carrier member. The carrier member is adapted for releasable engagement with the structure to conceal the identification means from visual detection on structure.

Preferably the identification means includes an enlongated metal strip having a preselected length and thickness. The strip is flexible to facilitate insertion and confinement thereof within the carrier. Most preferably the metal strip is fabricated of a heat resistant metal. The metal is capable of withstanding elevated temperatures in the range of between about 1,200°-2,000° F. (649°-1093° C.). For this temperature range the metal strip is fabricated of a high temperature alloy, for example "Incoloy" or "Hastelloy".

In one embodiment the carrier member is a fastener device, for example a wood or metal screw. In each case the fastener device has a head portion at one end and a shank portion at the opposite end. The head portion and the shank portion in one embodiment are releasably attached. The assembled fastener device is adapted for releasable insertion in a structure where the shank portion is embedded in the structure. The shank portion has an internal cavity with an upper open end. The identification means, for example, in the embodiment of a flexible metal strip in a coiled configuration is inserted through the open end into the internal cavity. The head portion is connected to the shank portion to close the open end and conceal the identification means within the internal cavity.

With this arrangement a fastener device in the embodiment of a wood or metal screw can be inserted in a structure with the metal strip containing selected markings such as a combination of numbers and letters to identify ownership of the structure. Thus if the structure is stolen and later recovered the screw can be removed and the metal strip with the markings used to prove ownership of the structure. Further in the case where the metal strip is heat resistant, if the structure should be substantially destroyed by fire, the metal strip would remain intact to serve as a means for identifying the structure. Also in accordance with the present invention, a miniature radar transponder is positioned within the carrier, such as a fastener, for transmitting a coded identification signal to locate.

Any number of the metal strip identifiers can be concealed in carriers, such as threaded fasteners, and secured in a plurality of locations on the structure. Thus by concealing a multiplicity of identifiers on the structure the detection of one of the identifiers by a thief will not deter later identification of ownership. Regardless the number of identifiers located less than the total number positioned on the structure, a thief will be presented with the dilemma of continuing to search for additional identifiers or concluding that all identifiers have been located. This uncertainty, in and of itself, presented to a thief creates a deterrent to theft.

In a further embodiment of the present invention the carrier member is fabricated of a preselected material matching the material of the structure for receiving the carrier member. This is particularly applicable in the case of identifying furniture and most particularly antique furniture. The carrier member may be in the form of a plug or the like. The plug in one embodiment has inscribed thereon suitable identifying marks. In another embodiment the plug is provided with an external annular recess. A metal strip with indicia placed thereon is removably positioned in the external annular recess. Thus the metal strip is concealed when the plug is inserted in a bore of the structure or otherwise concealed on the structure.

An additional feature of the present invention includes the carrier member in the form of an amorphous body. The identification means, such as a metal strip, is encapsulated within the amorphous body. The amorphous body may be fabricated of a refactory material. The metal strip is positioned in the amorphous body prior to firing the refractory material of the body. The metal strip is capable of withstanding elevated temperatures in the range between about 1,200°-2,000° F. The metal strip is concealed from visual detection in the amorphous body.

The amorphous body can be a ceramic casing encapsulating a metal identifying strip. The ceramic casing is adaptable for attachment to an object of ceramic material, such as a vase or piece of sculpture. The ceramic casing is attached to the ceramic object at a location not readily apparent. In the event the vase is lost or stolen and later recovered, the original owner would be able to establish ownership and regain possession of the ceramic object by removing the ceramic casing from the object and breaking open the casing to obtain access to the metal identifying strip.

Accordingly the principal object of the present invention is to provide apparatus for identifying a structure in which a suitable identification means, such as a heat resistant metal strip containing identifying information, is positioned in a concealed manner in a carrier member which is attached to an object in a position not readily detectable to serve as a means for identifying ownership or providing other information related to the object.

Another object of the present invention is to provide apparatus for identifying personal possessions which have been partly damaged due to fire or have been recovered after theft.

A further object of the present invention is to provide an identifier fabricated of a material, such as a high temperature alloy, capable of withstanding the heat from a fire and to remain intact to serve as a means for identifying a structure to which the identifier is attached.

Another object of the present invention is to provide apparatus containing information related to identification of personal property where the apparatus is mounted on the property in an undetectable manner so that in the event the property is stolen and later recovered the apparatus can be removed from the property to establish rightful ownership.

These and other objects of the present invention will be more completely disclosed and described in the following specification, the accompanying drawings, and the appended claims.

DESCRIPTION OF THE PREFERRED EMBODIMENTS

Figure 1:
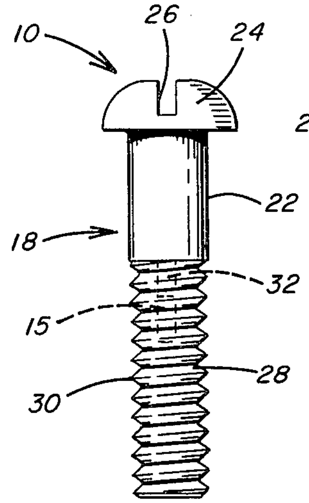
FIG. 1 is a view in side elevation of a threaded member having an upper end portion releasably connected to a lower threaded end portion, illustrating in phantom a cavity in the lower threaded end portion for receiving and concealing an identifier.

Referring to the drawings and particularly to FIG. 1 there is illustrated apparatus generally designated by the numeral 10 for identifying a selected object or structure which is arranged to receive the apparatus 10 in a manner to prevent detection of the identifying information contained within the apparatus 10 in accordance with the present invention. The apparatus 10 includes an identification device or identifier 12, shown in phantom in FIG. 1, concealed within the apparatus 10.

Figure 2:
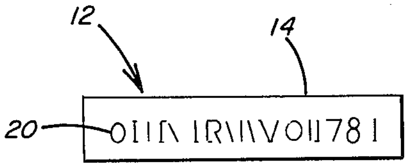
FIG. 2 is a view in side elevation of one embodiment of an identifier that includes a metal strip, illustrating on a face of the metal strip suitable alpha-numeric information for identifying ownership of a structure.
Figure 4:
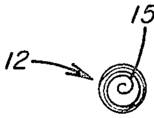
FIG. 4 is a top plan view of the coiled metal strip shown in FIG. 3.
Figure 3:
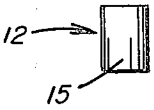
FIG. 3 is a view in side elevation of the metal strip in a coiled configuration to facilitate insertion in the internal cavity of the threaded member illustrated in FIG. 1.

Perferably the identifier 12 includes the embodiment shown in FIGS. 2-4 and is a flexible elongated metal strip 14 having a preselected length, width, and thickness. The metal strip 14 is flexible so as to permit the strip to be rolled up in a coil 15, as shown in FIG. 3. The coil 15 has a preselected diameter, as shown in FIG. 4, so that the metal strip coil 15 can be inserted within an internal cavity 32 of a carrier member 18. The metal strip 14 encased within the carrier member 18 forms one embodiment of the identification apparatus 10 as shown in FIG. 1.

The identifier 12 has inscribed thereon, in a suitable manner, preselected information associated with a structure. For example the structure may be an item of personal property or a household possession. The apparatus 10 selectively identifies the structure and particularly identifies ownership of the structure so that in the event the structure is stolen and later recovered or substantially destroyed by fire ownership and identity of the structure can be efficiently established.

As illustrated in FIG. 2 the metal strip 14 embodying the identifier 12 has inscribed thereon selective indicia 20, which may be in the form of an identifying alpha-numeric serial number that identifies the structure to which the apparatus 10 is attached. The alpha-numeric serial number 20 may be coded in terms of the identity of the structure, for example a television set, an automobile, or like personal property, and the identity of the individual who owns the structure. By identifying the individual who owns the structure, if the structure should be destroyed by fire and in the case of identifier 12 being a heat resistant material, as will be explained later in greater detail, the identifier 12 would be recoverable to provide the information necessary to file an insurance claim for reimbursement of the loss.

In the case of the structure being stolen and later recovered, the apparatus 10 would be removed from the structure to disclose the information necessary to return the structure to its rightful owner. Until the apparatus 10 is removed from the structure to be identified by the identifier 12, the carrier member 18 remains engaged to the structure so as to conceal the identifier 12 from visual detection on the structure. In addition, when the apparatus 10 is engaged or attached to the structure, the apparatus 10 appears as an integral part of the structure.

As illustrated in FIG. 1 and FIGS. 5–7 the carrier member 20 is a conventional fastener 22, plug, or the like such as a metal or wood screw or any other type of fastener which is threaded or unthreaded. The fastener or plug 22 is shown in FIG. 1 in an assembled arrangement and in FIG. 5 in an unassembled arrangement. The fastener or plug 22 has a head portion 24 with a slot 26 extending across the head portion to receive the blade of a screw driver as well known in the art of threaded fasteners. A shank portion 28 having external threads 30 thereon is positioned at the opposite end of the fastener 22 and extends from the head portion 24. The head portion 24 and the shank portion 28 are releasably attached.

Figure 5:
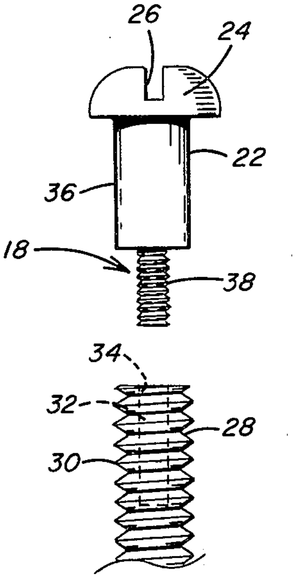
FIG. 5 is a disassembled view in side elevation of the threaded member shown in FIG. 1, illustrating an externally threaded end of the upper end portion adapted for threaded engagement within the internally threaded bore of the lower threaded end portion.

As seen in FIG. 5 the shank portion 28 has an internal cavity 32 with an open end portion 34. The identifier 12 in the form of the metal strip coil 15 is freely inserted in the internal cavity 32 when the fastener head portion 24 is detached from the fastener shank portion 28. The metal strip coil 15 is not shown in FIG. 5 but is shown in FIG. 1 with the head portion 24 and shank portion 28 in assembled relation. The metal strip coil 15 is inserted and removed through the cavity open end portion 34. When the head portion 24 is connected to the shank portion 28 the open end portion 34 is closed thereby concealing the identifier 12.

The fastener head portion 24 may be releasably connected to the fastener shank portion 28 in a preselected manner. In FIG. 5 a threaded connection is shown for the head portion 24 to the shank portion 28, and in FIG. 6 the head portion 24 is adaptable to engage the shank portion 28 by a releasable press fit. With the arrangement shown in FIG. 5 the head portion 24 includes an enlarged cylindrical portion 36 and a reduced cylindrical portion 38 extending from and formed integral with the enlarged cylindrical portion 36. The reduced cylindrical portion 38 is externally threaded and has a preselected length for insertion in the internal cavity 32 of the shank portion 28.

The internal cavity 32 is threaded to receive the threads of the cylindrical portion 38. Preferably the cylindrical portion 38 and the internal cavity 32 are left hand threaded. The shank portion 28 is right hand threaded. With this arrangement the fastener 22 can be removed from threaded engagement with the structure without unthreading the head portion 24 from the shank portion 28 upon rotation of the assembled fastener 22.

The length of the internal cavity 32 is greater than the length of the reduced cylindrical portion 38 so that when the enlarged cylindrical portion 36 is positioned abutting the upper end of the shank portion 28 and the cylindrical portion 38 is completely within the internal cavity 32, the end of the cylindrical portion 38 is not bottomed within the cavity 32. Sufficient space remains in the cavity 32 between the end of the cylindrical portion 38 and the closed end of the cavity 32 to receive the metal strip 14 when rolled up in the coil 15 as shown in FIGS. 3 and 4.

When the head portion 24 and the shank portion 28 are connected, the metal strip 14 is concealed from visual detection. Then when the fastener 22 is threaded into engagement with the structure the identifying apparatus 10 is not distinguishable from other conventional fasteners on the structure. In accordance with the present invention the apparatus 10 is selected with an external configuration and design which is identical to other fasteners used on the structure to conventionally secure together the elements of the structure.

Figure 6:
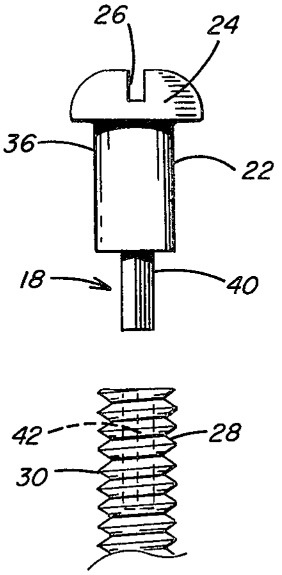
FIG. 6 is a view similar to FIG. 5, illustrating the threaded member upper end portion having a stem extending therefrom for frictional engagement within an elongated bore of the lower threaded end portion to facilitate insertion and concealment of the coiled metal strip within the bore.

With the embodiment of the fastener or plug 22, as illustrated in FIG. 6, in accordance with the present invention the connection between the head portion 24 and the shank portion 28 is a press fit. With this arrangement the head portion enlarged cylindrical portion 36 has extending therefrom a shaft or stem 40. The length of stem 40 does not exceed the length of a bore 42 in the shank portion 28. The bore 42 corresponds to the internally threaded cavity 32 of the shank portion 28 illustrated in FIG. 5.

The shaft or stem 40 has a preselected configuration which may in one embodiment be rectangular in cross section corresponding to a rectangular bore 42, tapered in cross section corresponding to a tapered bore 42, cylindrical in cross section corresponding to a cylindrical bore 42, or the like. In any case, the shaft 40 is releasably engagable within the bore 42 to frictionally engage the shank portion 28 and thereby connect the head portion 24 to the shank portion 28. When the shaft 40 is inserted in the bore 42 the frictional engagement of the shaft 40 with the shank portion 28 prevents the head portion 24 from being readily disengaged from the shank portion 28.

The frictional engagement of the shaft 40 with the shank portion 28 is sufficient to resist separation of the head portion 24 from the shank portion 28 when the head portion 24 is rotated to unthread the shank portion 28 from the structure to which the fastener or plug 22 is secured. This assures that the fastener or plug 22 remains assembled but permits separation of the head portion 24 from the shank portion 28 when the identifier 12 is either inserted or removed from the bore 42.

As with the arrangement illustrated and described above for FIG. 5, for the arrangement in FIG. 6 where the enlarged cylindrical portion 36 is positioned in abutting relation with the top of the shank portion 28, the shaft 40 does not extend to the closed end of the bore 42. Sufficient space remains in the bore 42 between the end of the shaft 40 and the end of the bore 42 for containment of the coiled metal strip 14 or any other suitable type of identification means having selected information contained thereon. As with the above described arrangement, when the shaft 40 is fully inserted in the bore 42 the head portion 24 is engaged to the shank portion 28 to facilitate insertion and removal of the fastener or plug 22 from a structure. The identifier 12 is concealed within the bore 42 and is undetectable.

Figure 7:
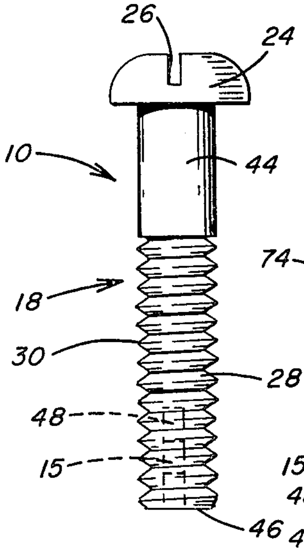
FIG. 7 is a view in side elevation of another embodiment of a threaded member for concealing the metal strip shown in FIG. 2, illustrating a bore extending from the lower end of the threaded portion for receiving the coiled metal strip.

Referring to FIG. 7, there is illustrated a further embodiment of a carrier member 18 in the form of a threaded fastener 44 similar to the fastener 22 illustrated in FIG. 1. With the fastener 44 shown in FIG. 7 the shank portion 28 is integrally connected to the head portion 24 as with the case of a conventional fastener, such as a wood screw, metal screw, or the like. The shank portion 28 includes an outer end 46 through which and into the body of the shank portion 28 a bore 48 extends. The bore 48 has a preselected length and diameter to receive and retain the metal strip 14 shown in FIG. 1 when rolled into the coil 15 shown in FIGS. 3 and 4. The metal coil 15 is advanced through the opening into the bore 48 to a position completely within the bore 48 so as not to be readily detectable.

Figure 7A:
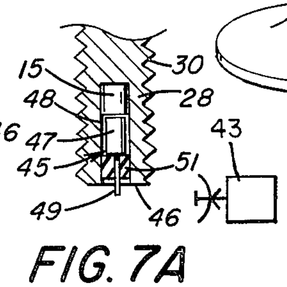
FIG. 7A is an enlarged fragmentary sectional view of the threaded member shown in FIG. 7, illustrating the addition of a transmitting device in the threaded portion.

As illustrated in FIG. 7A, there is shown a further embodiment of the identifier 12 of the present invention in the form of a signal generating device generally designated by the numeral 45. The signal generating device 45 is positioned within the bore 48 of the fastener shank portion 28 for the carrier 18 shown in FIG. 7. The signal generating device 45 is shown in combination with the coiled metal strip 15 positioned above the device 45 in the bore 48. However, it should be understood that the signal generating device 45 is operable alone without the identifying strip 15 in the bore 48 as the identification device in accordance with the present invention.

Preferably the signal generating device 45 is a radar transponder of the type well known in the art of radar electronics. These devices are commercially available in a variety of sizes that range from the miniature size shown in FIG. 7A to pocket size and larger. A known commercial source of radar transponders is the Government Electronics Division of Motorola, Inc., Tempe, Ariz.

The radar transponder 45 includes a base 47 which houses a suitable battery, and an antenna 49 projects out of the base 47. Preferably the radar transponder 45 is positioned within the bore 48 so that the antenna 49 extends slightly out of the bore 48 and from the shank outer end 46. A resilient washer or stopper 51 retains the radar transponder 45 within the bore 48 and includes a bore through which the antenna 49 extends.

The radar transponder 45 is operable to transmit from the carrier 18 a preselected signal, such as radar signal at a preselected frequency. The signal is preferably coded in order to identify the source of the signal and ultimately the identification of ownership of the structure to which the carrier 18 is attached, for example, a stolen automobile.

The radar transponder 45 is actuated to transmit a signal by receiving an incoming signal from a transmitter 43 diagrammatically illustrated in FIG. 7A, such as an aircraft radio. The signal from the transmitter to the radar transponder 45 is also coded so that the transponder 45 is not unintentionally actuated. In response to the incoming coded signal, the radar transponder 45 transmits a preselected signal which may be a single blip-type signal or two blip codes. The signal appears on the radar screen of the aircraft and the location and identification of the radar transponder 45 is ascertained.

With this arrangement in the event an automobile, having the radar transponder 45 in the carrier 18, is stolen and it is known that the automobile is within a given range, a tracking aircraft emitting the coded incoming signal can actuate the radar transponder 45 to transmit an output signal back to the aircraft. By known methods the location of the transponder 45 can be determined to assist in efforts to recover the stolen automobile or any other object containing the radar transponder 45.

Figure 8:
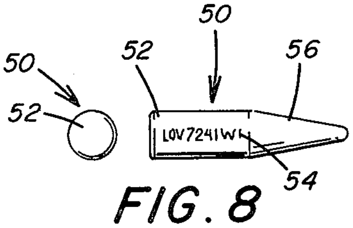
FIG. 8 illustrates an embodiment of the identifier which includes a plug having inscribed thereon indicia for indentifying a structure to which the plug is removably attached.

Not only may the bore 48 of the fastener 22 illustrated in FIG. 7, as well as the fasteners 22 above described for FIGS. 5 and 6, receive a coiled metal strip 14 but is also adaptable to receive an identifier 12 in the form of a plug 50 illustrated in FIG. 8. The plug 50 may be fabricated of a preselected material which may also be heat resistant and selectively shaped to facilitate insertion, retention, and removal from the threaded shank portion 28 for the fastener embodiments shown in FIGS. 5–7. The plug 50, for example, as illustrated in FIG. 8 has a cylindrical portion 52 inscribed with selected indicia such as an alpha-numeric serial number 54. Extending from the cylindrical portion 52 is a tapered portion 56. With this arrangement the plug 50 is inserted into the bore 48 of FIG. 7 with the tapered portion 56 first advanced into the bore 48 and thereafter the cylindrical portion 52 inserted in the bore 48 until the end of the cylindrical portion 52 is flush with the outer end 46 of the shank portion 28.

The dimension of the plug cylindrical portion 52 is designed to provide frictional engagement of the plug 50 with the shank portion 28 within the bore 48 to securely retain the plug 50 therein, but in a manner to facilitate easy removal therefrom. The identifier 12 in the form of the plug 50 is also adaptable for insertion in the internal cavity 32 of the shank portion 28 of FIG. 5 and the bore 42 in the shank portion 28 of FIG. 6. In the embodiments of FIGS. 5 and 6 the plug 50 is extended into the respective cavity 32 and bore 42 to permit insertion of the respective threaded portion 38 and the respective shaft 40. Also it should be understood that the identifier 12 may be shaped in any desired fashion to permit its insertion and concealment within a facsimile fastener 22 or any other type of carrier member 18 which is to be attached to a structure so as to conceal the presence of the identifier 12.

Not only may the identifier 12 be constructed in a selected shape and size, it may also be constructed of a preselected material as desired. In one embodiment of the present invention the identifier 12 in the form of a metal strip 14 as shown in FIGS. 2–4 is constructed of a heat resistant metal capable of withstanding elevated temperatures in the range of between about 1200° and 2000° F. (649°–1093° C.). An example of such a material is stainless steel or one of the commercially available nickel base high temperature alloys, such as "Incoloy" or "Hastelloy". Further, the carrier member 18 whether it be in the form of a fastener 22, as illustrated in FIGS. 1 and 5-7, or a plug, as illustrated in FIG. 8, may also be fabricated of a high heat resistant material of the above discussed materials.

With both the carrier member 18 and the identifier 12 fabricated from a high heat resistant material, in the event the structure to be identified is substantially destroyed by fire, the structure remains can be properly identified and a value placed thereon by recovery of the carrier member 18 with the identifier 12 intact from the damaged structure. Finding the carrier member 18 on the damaged structure can be facilitated with a conventional metal detecting device. It will also be apparent that a plurality of apparatus 10 including the identifier 12 and the carrier member 18 may be secured to a single structure to be identified where each apparatus 10 would be indistinguishable from other similarly shaped objects whether they be threaded fasteners or unthreaded plugs and the like.

Figure 11:
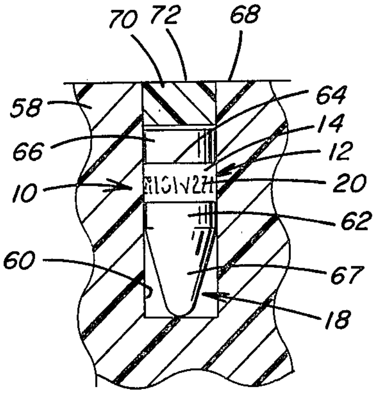
FIG. 11 is a fragmentary sectional view in side elevation of another embodiment of the present invention, illustrating an object having a bore for receiving a plug with the metal strip containing identifying information wrapped around the plug, and a cap fabricated of material similar to the material of the object closing the bore to prevent detection of the plug and the metal strip.

Now referring to FIG. 11 there is illustrated a further embodiment of the apparatus 10 which is retained in a concealed manner within a structure 58 to be identified by the apparatus 10. The structure 58 may be an item of personal property varying in type from a household article, such as furniture, to an automobile, a boat, or any other item of personal property which is to be identified in the event of loss by theft when later recovered or partial destruction by fire or other catastrophic occurrence.

In the case, for example, of a boat having a fiber glass structure 58 a bore 60 extending from the outer surface of the structure 58 is formed to receive the identifying apparatus 10. As illustrated in FIG. 11 the apparatus 10 includes a carrier member in the form of a plug 62 similar in shape to the plug 50 described above and illustrated in FIG. 8. In one embodiment the plug 62 is provided with an annular recess 64 on a cylindrical body portion 66. An identifier 12 in the form of the metal strip 14 containing an alpha-numeric serial number 20 is positioned around the cylindrical body portion 66 within the annular recess 64 to thereby securely retain the metal strip 14 on the plug 62.

The plug 62 is fully inserted in the bore 60 to the point where plug tapered end portion 67 is bottomed within the bore 60. The opposite end of the plug 62 is then spaced from an outer surface 68 of the structure 58. The remaining portion of the bore 60 is occupied by a cap 70. The cap 70 is fabricated of a material corresponding to the material of the structure 58. The cap 70 is easily inserted and removed from the bore 60 to thereby conceal the plug 62 in the bore 60 and prevent visual detection of the identifying apparatus 10.

Preferably, the cap 70 is positioned in abutting relation with the cylindrical body portion 66 so that the exposed surface 72 of cap 70 is flush or coplanar with the outer surface 68 of the structure 58. With this arrangement, as in the case where the structure 58 is a fiber glass boat, both the structure 58 and the cap 70 are fabricated of the same material. This provides a very deceptive arrangement for concealing the location of the identifying apparatus 10 on the structure 58 which location is preferably known only by the owner.

Figure 9:
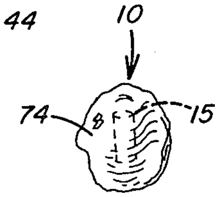
FIG. 9 is a schematic representation of an amorphous body, such as a ceramic casing, having encapsulated therein the metal strip of FIG. 2 in a coiled arrangement.
Figure 10:
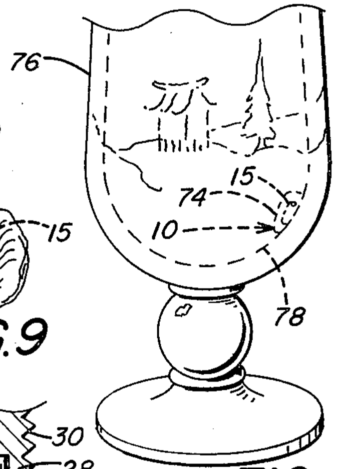
FIG. 10 is a schematic representation of the manner of utilizing the metal strip encapsulated within a ceramic casing as shown in FIG. 9 where the casing is removably attached to a ceramic object, such as a vase, in a position where the ceramic casing is not readily detectable.

An additional embodiment of the present invention is illustrated in FIGS. 9 and 10 where the apparatus 10 includes a carrier member in the form of an amorphous body or casing 74. An identifier 12, such as the metal coil 15, is encapsulated within the amorphous body 74. Preferably the amorphous body 74 is fabricated of a refractory material, such as a ceramic material. With this arrangement the carrier member in the form of an amorphous body 74, as well as, the heat resistant metal coil 15 is capable of withstanding elevated temperatures and preferably temperatures in the range of between about 1200° and 2000° F. (649°-1093° C.) or temperatures encountered in a fire. With the identifier 12 concealed from visual detection within the amorphous body 74 when the amorphous body 74 is attached to a preselected structure, such as a ceramic structure 76 illustrated in FIG. 10, means is provided for identifying the structure 76 if stolen and later recovered or substantially damaged by fire.

In the case where the amorphous body or casing 74 is a ceramic material during the initial formation of the body 74 the metal strip 14 with the identifying information inscribed thereon is encapsulated within the ceramic material before it is fired. Thus the metal strip 14 becomes an integral part of the amorphous ceramic casing 74. Therefore, in use on a structure such as a ceramic vase 76, illustrated in FIG. 10, the metal strip 14 encapsulated within the ceramic amorphous body 74 may be attached in an inconspicuous location on the structure 76. For example, the amorphous body 74 can be attached to the interior wall 78 of the structure 76. In this position the amorphous body 74 is not readily detected from an external viewing of the vase 76.

The amorphous body or casing 74 may be suitably attached in a conventional method as by bonding to the vase internal wall 78 or it may be formed integral with the vase 76 during the fabrication of the vase 76. Further, to prevent ready detection of the apparatus 10 the amorphous body or casing 74 may be painted, shaded, textured, or the like to conform to the aesthetic characteristics of the structure 76.

According to the provisions of the Patent Statutes, we have explained the principle, preferred construction, and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for identifying a structure comprising,
identification means containing preselected information associated with a structure for selectively identifying the structure,
a carrier member,
means associated with said carrier member for removably supporting said identification means on said carrier member,
said identification means includes an elongated metal strip having a preselected length and thickness,
said metal strip being flexible to facilitate insertion and confinement thereof within said carrier, and
said carrier member being adapted for releasable engagement with said structure to conceal said identification means from visual detection on the structure.

2. Apparatus for identifying a structure as set forth in claim 1 in which,
said carrier member includes a fastener device,
said fastener device having a head portion at one end and a shank portion at the opposite end,
said head portion and said shank portion being releasably attached, said fastener device being adapted for releasable insertion in a structure with the shank portion maintained in a concealed position within the structure, said shank portion having an internal cavity with an open end, said identification means being inserted through said open end into said internal cavity, and said head portion being connected to said shank portion to close said open end and conceal said identification means within said internal cavity.

3. Apparatus for identifying a structure as set forth in claim 2 in which, said head portion has an end portion arranged for insertion through said shank portion open end and into said cavity to frictionally engage said shank portion and assemble said head portion and said shank portion, and said identification means being retained in a concealed position within said cavity of said assembled shank and head portions.

4. Apparatus for identifying a structure as set forth in claim 3 in which, said head end portion is externally threaded and said cavity internally threaded to threadedly receive said head end portion, and said identification means being positioned in said cavity below said head end portion.

5. Apparatus for identifying a structure as set forth in claim 3 which includes, a shaft extending from said head end portion and press fit into said cavity to maintain said head portion and said shank portion releasably connected, and said identification means being positioned in said cavity below said head end portion.

6. Apparatus for identifying a structure as set forth in claim 1 in which, said carrier member includes a fastener device, said fastener device having a head portion at one end and a shank portion at the opposite end, said fastener device being adapted for releasable insertion in a structure with said shank portion maintained in a concealed position within the structure, a bore extending from the end of said shank portion into said shank portion, and said identification means being removably inserted in said bore to conceal said identification means within said shank portion.

7. Apparatus for identifying a structure as set forth in claim 1 in which, said carrier member includes an amorphous body, and said identification means being encapsulated within said amorphous body.

8. Apparatus for identifying a structure as set forth in claim 7 in which, said amorphous body is fabricated of a refractory material, said identification means including a strip of heat resistant metal capable of withstanding elevated temperatures in the range of between about 1,200° and 2,000° F. (649°-1093° C.), and said metal strip being concealed from visual detection within said amorphous body.

9. Apparatus for identifying a structure as set forth in claim 8 which includes, a structure fabricated of refractory material corresponding to the refractory material of said amorphous body, and said amorphous body being attached to said structure to identify said structure.

10. Apparatus for identifying a structure as set forth in claim 1 in which, said carrier member includes a plug having a preselected configuration, said plug arranged to support said identification means, said plug being adapted for insertion within a bore of a structure, said plug having an end portion positioned within the bore, a plug cap fabricated of a material corresponding to the material of the structure, and said plug cap being inserted within the bore to conceal said plug from visual detection in the structure.

11. Apparatus for identifying a structure as set forth in claim 10 in which, said metal strip being supported by said plug, and said metal strip being inscribed with information identifying the structure.

12. Apparatus for identifying a structure as set forth in claim 1 in which said identification means includes, a radar transponder for transmitting a preselected signal from said carrier member, said radar transponder being secured to said carrier member in a position to transmit a preselected signal from said carrier member for identifying the location of said carrier member, said radar transponder having an antenna for receiving an incoming signal, said carrier having an opening therein forming an internal recess for receiving said radar transponder, said antenna projecting out of said recess to receive an incoming signal, transmitter means associated with said radar transponder for generating a coded incoming signal to actuate said radar transponder, and said radar transponder being operable upon actuation to transmit a preselected coded signal from said carrier back to said transmitter means to indicate the location of said carrier.

13. Apparatus for identifying a structure comprising, identification means containing preselected information associated with a structure for selectively identifying the structure, a carrier member, means associated with said carrier member for removably supporting said identification means on said carrier member, said identification means includes an elongated metal strip having a preselected length and thickness, said metal strip being flexible to facilitate insertion and confinement thereof with said carrier, said metal strip being fabricated of a heat resistant metal, said metal strip being capable of withstanding elevated temperatures in the range of between about 1,200°-2,000° F., and said carrier member being adapted for releasable engagement with the structure to conceal said identification means from visual detection on the structure.

14. Apparatus for identifying a structure comprising, identification means containing preselected information associated with a structure for selectively identifying the structure, a carrier member, means associated with said carrier member for removably supporting said identification means on said carrier member, said identification means includes an elongated metal strip having a preselected length and thickness, said metal strip being flexible to facilitate insertion and confinement thereof within said carrier, said metal strip being fabricated of a high temperature alloy, and said carrier member being adapted for releasable engagement with the structure to conceal said identification means from visual detection on the structure.

15. Apparatus for identifying a structure comprising, identification means containing preselected information associated with a structure for selectively identifying the structure, a carrier member, means associated with said carrier member for removably supporting said identification means on said carrier member, said identification means includes a plug member having preselected identifying information thereon, said carrier member having a bore for releasably receiving said plug member, said plug member being concealed within said carrier member bore, and said carrier member being adapted for releasable engagement with the structure to conceal said identification means from visual detection on the structure.

16. Apparatus for identifying a structure as set forth in claim 15 in which, said carrier member includes a fastener device, said fastener device having a head portion at one end and a shank portion at the opposite end, said head portion and said shank portion being releasably attached, said fastener device being adapted for releasable insertion in a structure with said shank portion maintained in a concealed position within the structure, said shank portion having said bore with an open end, said identification means being inserted through said open end into said bore, and said head portion being connected to said shank portion to close said bore and conceal said identification means within said fastener device.

17. Apparatus for identifying a structure as set forth in claim 16 in which, said head portion has an end portion arranged for insertion through said shank portion open end and into said bore to frictionally engage said shank portion and assemble said head portion and said shank portion, and said identification means being retained in a concealed position within said bore of said assembled shank and head portion.

18. Apparatus for identifying a structure as set forth in claim 17 in which, said head end portion is externally threaded and said bore is internally threaded to threadedly receive said head end portion, and said identification means being positioned in said bore below said head end portion.

19. Apparatus for identifying a structure as set forth in claim 17 in which, said head end portion is press fit into said bore to maintain said head portion and said shank portion releasably connected, and said identification means being positioned in said bore below said head end portion.

20. Apparatus for identifying a structure comprising, identification means containing preselected information associated with a structure for selectively identifying the structure, a carrier member, means associated with said carrier member for removably supporting said identification means on said carrier member, said identification means includes a plug member having preselected identifying information thereon, said carrier member having a bore for releasably receiving said plug member, said plug member being concealed within said carrier member bore, said carrier member being fabricated of a preselected material, said plug member being fabricated of a material corresponding to said carrier member material, and said carrier member being adapted for releasable engagement with the structure to conceal said identification means from visual detection on the structure.

21. Apparatus for identifying a structure comprising, identification means containing preselected information associated with a structure for selectively identifying the structure, a carrier member, means associated with said carrier member for removably supporting said identification means on said carrier member, said identification means includes a plug member having preselected identifying information thereon, said carrier member having a bore for releasably receiving said plug member, said plug member being concealed within said carrier member bore, said plug member having an external annular recess, a metal strip with indicia placed thereon, said metal strip being removably positioned within said external annular recess, said metal strip being concealed in said plug member positioned in said carrier member bore, and said carrier member being adapted for releasable engagement with the structure to conceal said identification means from visual detection on the structure.

22. Apparatus for identifying a structure comprising, identification means containing preselected information associated with a structure for selectively identifying the structure, a carrier member, means associated with said carrier member for removably supporting said identification means on said carrier member, said carrier member including a fastener device, said fastener device having a head portion at one end and a shank portion at the opposite end, said head portion and said shank portion being releasably attached,
said fastener device being adapted for releasable insertion in a structure with the shank portion maintained in a concealed position within the structure,
said shank portion having an internal cavity with an open end,
said identification means being inserted through said open end into said internal cavity,
said head portion being connected to said shank portion to close said open end and conceal said identification means within said internal cavity,
said head portion having an end portion arranged for insertion through said shank portion open end and into said cavity to frictionally engage said shank portion and assemble said head portion and said shank portion,
said identification means being retained in a concealed position within said cavity of said assembled shank and head portions,
said head end portion being externally threaded and said cavity internally threaded to threadedly receive said head end portion, and
said identification means being positioned in said cavity below said head end portion.

23. Apparatus for identifying a structure as set forth in claim 22 in which,
said identification means includes an elongated metal strip having a preselected length and thickness, and
said metal strip being flexible to facilitate insertion and confinement thereof within said carrier.

24. Apparatus for identifying a structure as set forth in claim 23 in which,
said metal strip is fabricated of a heat resistant metal, and
said metal being capable of withstanding elevated temperatures in the range of between about 1,200°-2,000° F.

25. Apparatus for identifying a structure as set forth in claim 23 in which,
said metal strip is fabricated of a high temperature alloy.

26. Apparatus for identifying a structure as set forth in claim 22 in which,
said identification means includes a plug member having preselected identifying information thereon, and
said plug member releasably positioned in said internal cavity.

27. Apparatus for identifying a structure as set forth in claim 26 in which,
said carrier member is fabricated of a preselected material, and
said plug member being fabricated of a material corresponding to said carrier member material.

28. Apparatus for identifying a structure as set forth in claim 22 in which,
said identification means includes a plug member having an external annular recess,
a metal strip with indicia placed thereon,
said metal strip being removably positioned within said external annular recess, and
said metal strip being concealed in said plug member positioned in said internal cavity.

29. Apparatus for identifying a structure as set forth in claim 22 in which,
said shank portion internal cavity including a bore extending from the end of said shank portion into said shank portion, and
said identification means being removably inserted in said bore to conceal said identification means within said shank portion.

30. Apparatus for identifying a structure comprising,
identification means containing preselected information associated with a structure for selectively identifying the structure,
a carrier member,
means associated with said carrier member for removably supporting said identification means on said carrier member,
said carrier member includes an amorphous body,
said identification means being encapsulated within said amorphous body,
said amorphous body being fabricated of a refractory material,
said identification means including a strip of heat resistant metal capable of withstanding elevated temperatures in the range of between about 1,200 and 2,000° F. (649°-1093° C.),
said metal strip being concealed from visual detection within said amorphous body, and
said amorphous body being adapted for releasable engagement with the structure to conceal said identification means from visual detection on the structure.

31. Apparatus for identifying a structure comprising,
identification means containing preselected information associated with a structure for selectively identifying the structure,
a carrier member,
means associated with said carrier member for removably supporting said identification means on said carrier member,
said carrier member includes a plug having a preselected configuration,
said plug arranged to support said identification means,
said plug being adapted for insertion within a bore of a structure,
said plug having an end portion positioned within the bore,
a plug cap fabricated of a material corresponding to the material of the structure,
said plug cap being inserted within the bore to conceal said plug from visual detection in the structure,
said identification means including a metal strip supported by said plug,
said metal strip being inscribed with information identifying the structure, and
said plug being adapted for releasable engagement with the structure to conceal said metal strip from visual detection on the structure.

32. Apparatus for identifying a structure comprising,
identification means containing preselected information associated with a structure for selectively identifying the structure,
a carrier member,
means associated with said carrier member for removably supporting said identification means on said carrier member,
said carrier member includes a plug having a preselected configuration, said plug arranged to support said identification means, said plug being adapted for insertion within a bore of a structure, said plug having an end portion positioned within the bore, a plug cap fabricated of a material corresponding to the material of the structure, said plug cap being inserted within the bore to conceal said plug from visual detection in the structure, and said plug being adapted for releasable engagement with the structure to conceal said plug from visual detection on the structure.

33. Apparatus for identifying a structure as set forth in claim 32 in which, said identification means includes an elongated metal strip having a preselected length and thickness, and said metal strip being flexible to facilitate insertion and confinement thereof within said plug.

34. Apparatus for identifying a structure as set forth in claim 33 in which, said metal strip is fabricated of a heat resistant metal, and said metal being capable of withstanding elevated temperatures in the range of between about 1,200°-2,000° F.

35. Apparatus for identifying a structure as set forth in claim 33 in which, said metal strip is fabricated of a high temperature alloy.

36. Apparatus for identifying a structure as set forth in claim 32 in which, said plug has a head portion at one end and a shank portion at the opposite end, said head portion and said shank portion being releasably attached, said plug being adapted for releasable insertion in a structure with the shank portion maintained in a concealed position within the structure, said shank portion having an internal cavity with an open end, said identification means being inserted through said open end into said internal cavity, and said head portion being connected to said shank portion to close said open end and conceal said identification means within said internal cavity.

37. Apparatus for identifying a structure as set forth in claim 36 in which, said head portion has an end portion arranged for insertion through said shank portion open end and into said cavity to frictionally engage said shank portion and assemble said head portion and said shank portion, and said identification means being retained in a concealed position within said cavity of said assembled shank and head portions.

38. Apparatus for identifying a structure as set forth in claim 37 in which, said head end portion is externally threaded and said cavity internally threaded to threadedly receive said head end portion, and said identification means being positioned in said cavity below said head end portion.

39. Apparatus for identifying a structure as set forth in claim 37 in which, said head end portion is press fit into said cavity to maintain said head portion and said shank portion releasably connected, and said identification means being positioned in said cavity below said head end portion.

* * * * *